United States Patent [19]

Weber

[11] Patent Number: 5,653,124

[45] Date of Patent: Aug. 5, 1997

[54] REFRIGERATED INSULATED BEVERAGE CONTAINER SYSTEM

[76] Inventor: Martin Weber, 11183 W. 17th Ave, #4-102, Lakewood, Colo. 80215

[21] Appl. No.: 695,869

[22] Filed: Aug. 12, 1996

Related U.S. Application Data

[63] Continuation-in-part of Ser. No. 382,086, Feb. 1, 1995.
[51] Int. Cl.⁶ ........................................................ F25D 3/08
[52] U.S. Cl. ............................ 62/457.4; 62/457.3; 62/530
[58] Field of Search ................................ 62/457.2, 457.3, 62/457.4, 371, 372, 529, 530

[56] References Cited

U.S. PATENT DOCUMENTS

| | | |
|---|---|---|
| 4,163,374 | 8/1979 | Moore . |
| 4,183,226 | 1/1980 | Moore . |
| 4,299,100 | 11/1981 | Crisman et al. . |
| 4,383,422 | 5/1983 | Gordon et al. . |
| 4,544,077 | 10/1985 | Rucker . |
| 4,577,474 | 3/1986 | Peterson . |
| 4,671,424 | 6/1987 | Byrns . |
| 4,690,300 | 9/1987 | Woods . |
| 4,720,023 | 1/1988 | Jeff . |
| 4,746,028 | 5/1988 | Bagg . |
| 4,811,858 | 3/1989 | Augur . |
| 4,813,558 | 3/1989 | Fujiyoshi . |
| 4,872,577 | 10/1989 | Smith . |
| 4,892,215 | 1/1990 | Carlson . |
| 4,921,117 | 5/1990 | Mucciarone . |
| 4,928,848 | 5/1990 | Ballway . |
| 4,960,225 | 10/1990 | Gillis . |
| 4,961,324 | 10/1990 | Allan . |
| 4,981,022 | 1/1991 | Snyder . |
| 5,058,757 | 10/1991 | Proa . |
| 5,115,940 | 5/1992 | Friedman . |
| 5,147,067 | 9/1992 | Effertz . |
| 5,148,682 | 9/1992 | Wolf . |
| 5,163,608 | 11/1992 | Block . |
| 5,169,025 | 12/1992 | Guo . |
| 5,212,963 | 5/1993 | McGinnis . |
| 5,259,529 | 11/1993 | Coale . |
| 5,277,733 | 1/1994 | Effertz . |
| 5,361,604 | 11/1994 | Pier et al. . |
| 5,406,808 | 4/1995 | Babb et al. . |

Primary Examiner—William Doerrler

[57] ABSTRACT

An insulated stein for carrying and maintaining a constant temperature of a poured beverage or of a canned beverage, featuring a sleeve to slip the can into, an optional insulating vessel to alterntively slip into the sleeve that can by itself contain a beverage poured into the vessel, a D-handle for the user to grasp onto, a hinged lid that can be pivoted upwards or downwards to cover the top of the can or to make the can accessible to the user, and a portable reusable refrigerant disk that fits into a cavity in the bottom of the stein and is held in place by a fitted bottom cap. The stein is made of an injection molded thermoplastic selected for good insulating properties.

14 Claims, 5 Drawing Sheets

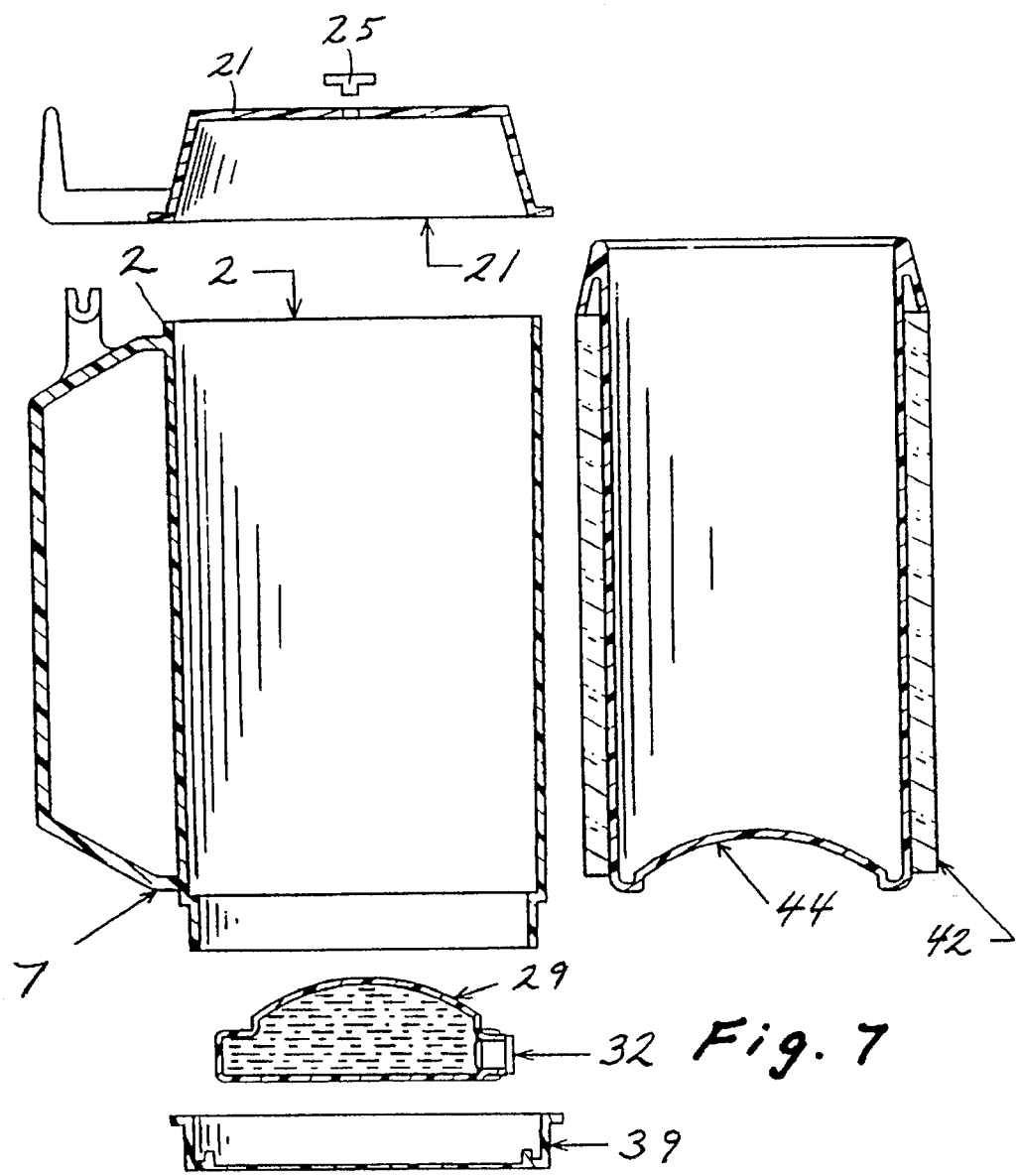
Fig. 6
Fig. 7
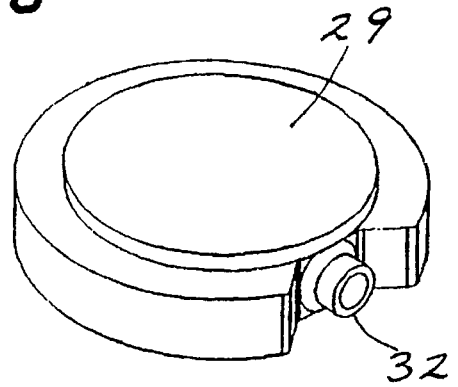
Fig. 9

REFRIGERATED INSULATED BEVERAGE CONTAINER SYSTEM

This application is a continuation in part of application 08.382,086, filed Feb. 1, 1995.

FIELD OF THE INVENTION

This invention relates generally to the field of drinking vessels and more particularly to specialized vessels that hold other drinking vessels within them, keeping such other vessels insulated and refrigerated.

BACKGROUND OF THE INVENTION

Most beverages in popular consumption today are packaged in bottles or cans in portions convenient for an individual to consume that beverage. Such beverage cans are usually made of aluminum or steel. Generally, a consumer will refrigerate such a can before consuming the beverage from the can. Naturally, as soon as the can is taken from a refrigerator, ice box or cooler, the can will start to warm up to any ambient temperature greater than that of the refrigerated storage from which the can was taken. The beverage within the can warms because heat and electromagnetic radiation from the surrounding environment will transfer across the surface of the can and into the drink. Heat transfer occurs through three mechanisms: conduction, convection and radiation. Conduction refers to heat transfer that occurs across a medium such as a warm hand touching an aluminum can. Convection refers to heat transfer that will occur between a surface and a moving fluid when they are at different temperature. Thermal radiation occurs because all surfaces of finite temperature emit energy in the form of electromagnetic waves. The sun emits electromagnetic waves which travel through space and retransform into heat when they strike an absorbing object. The waves can also be substantially reflected away by a reflective object. The consumer will generally find it desireable to be able to keep a beverage can cool while the consumer is drinking from the can. Therefore a need exists for a way of keeping a beverage can as cool as possible for as long as possible from the time that the beverage is taken from its refrigerated storage.

The prior art approaches to this need are replete with passive sleeves made out of thermally insulating material that have the intended purpose of slowing the conduction of heat from the ambient surroundings to the can and thus raising the temperature of the can's contents. The sleeves range from the extremely simple cylinder that is open at both ends and that either is unitary or attaches with snaps or velcro, to elaborate pre-molded shapes that incorporate a handle, or a bottom. None of these sleeves can provide ideal insulation, since a major portion of the can is always exposed to the ambient temperature. Some prior art approaches have incorporated a source of compressed gas as a means of providing portable refrigeration of an insulated can carrier. The problem with this approach is that there is a need to replenish compressed gas cannisters, and even if the gas is relatively inert, such as carbon dioxide, there is always some attendant danger of gas cylinder rapture. Another prior art approach has been to fabricate a double walled vessel containing a refrigeratable fluid within the double wall cavity. The entire vessel is placed into a refrigerator and when the fluid in the double wall cavity is cooled, the vessel stays cooler longer when the vessel is filled with a beverage. Each of these approaches suffers from the shortcoming that a significant part of the can is exposed to the ambient temperature. Another shortcoming in the passive type of containers is that whatever thermal efficiency exists is a function of the insulation properties of the containers' material alone, with no other factors contributing to the ability of the container to keep the can cold.

The present invention therefore has as an object the providing of a more thermally efficient container that minimizes heat conduction to a beverage can. Another object of the invention is to actively provide a source of refrigeration to a beverage container that does not rely on a disposable piece of apparatus but rather a reusable refrigerant module that applies the principle of convection to refrigerate a beverage can. Yet another object of the invention is to minimize the rate at which a beverage can warms up by applying the principle of radiation, through shading the top of a beverage can from the rays of the sun. The invention seeks to achieve these objects by providing for a completely enclosing multiple component jacket, featuring a movable top cap, that can cover the entire beverage can, and that contains within it a reusable refrigerant module that is contained within a portion of the jacket, that actively provides a source of refrigeration to the beverage can being held within the jacket. The invention features an insulated cylindrical sleeve, an insulating pivoting top cap, and an insulated bottom cap having a recess for holding a chilled, reuseable refrigerant module.

SUMMARY OF THE INVENTION

In summary, the invention is an insulated, refrigerated beverage container jacket, comprising: a substantially cylindrical sleeve of predetermined length, having an upper end and a lower end and having inner and outer side walls, said sleeve defining a predetermined interior diameter sufficiently large to accomodate a beverage container; a bottom cap defining a recess, said cap adapted so as to be removeably attached to the lower end of said sleeve, such that when said bottom cap is attached, then said jacket can receive and support a beverage container, said recess being of a predetermined dimension sufficient to receive a refrigerant module means; and a refrigerant module means capable of being separately refrigerated, and after being refrigerated, capable of being inserted into said bottom cap recess such that when a beverage container is inserted into said sleeve and said module is inserted into said bottom cap and said bottom cap is attached to the lower end of said sleeve, then said module is in sufficiently close proximity to said beverage container to refrigerate said beverage container.

In a prefered alternative embodiment, the invention is an insulated, refrigerated beverage container jacket, comprising: a substantially cylindrical sleeve of predetermined length, having an upper end and a lower end, said sleeve defining a predetermined interior diameter sufficiently large to accomodate a beverage container; and additionally having a graspable handle means that is fixably attached to said sleeve; a bottom cap defining a recess, said cap adapted so as to be removeably attached to the lower end of said sleeve, such that when said bottom cap is attached, then said jacket can receive and support a beverage container, said recess being of a predetermined dimension sufficient to receive a refrigerant module means; and a refrigerant module means capable of being separately refrigerated, and after being refrigerated, capable of being inserted into said bottom cap recess such that when a beverage container is inserted into said sleeve and said module is inserted into said bottom cap and said bottom cap is attached to the lower end of said sleeve, then said module is in sufficiently close proximity to said beverage container to refrigerate said beverage container.

BRIEF DESCRIPTION OF THE DRAWINGS

FIG. 6 is a cutaway side view of top cap, sleeve, bottom cap, and refrigerant disc.

FIG. 7 is a cutaway side view of an insulated beverage liner that can be placed within the sleeve of FIG. 6 to directly contain a beverage.

FIG. 9 is a perspective view of an embodiment of the refrigerant disc having a discontinuous side wall, and also showing a cappable filler spout.

DESCRIPTION OF THE PREFERRED EMBODIMENTS

The term "jacket" is used here in the sense of a thermally non-conducting cover having multiple components.

Figure 1:
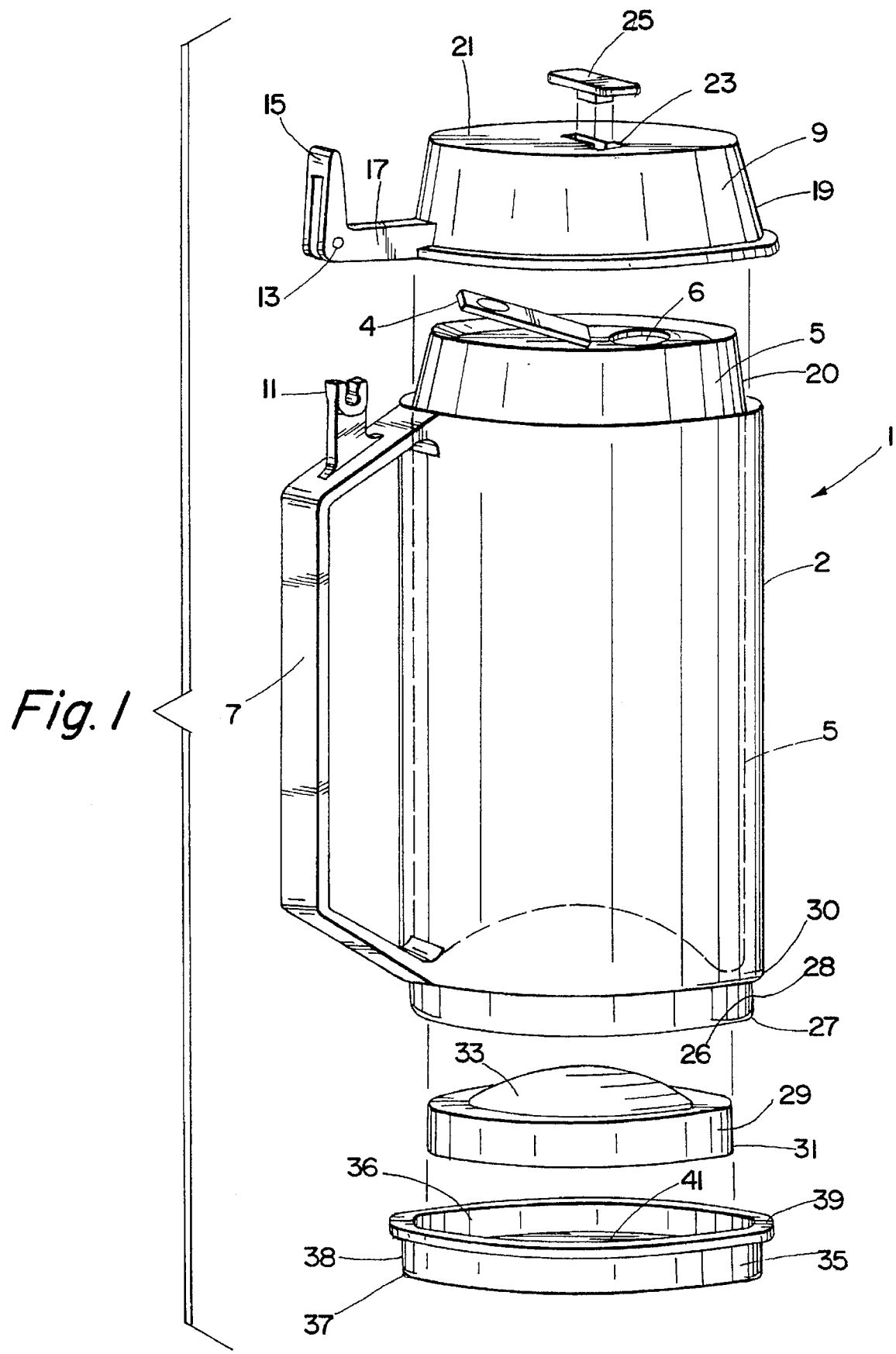
FIG. 1 is an exploded prospective view of the overall invention, showing the hinged top cap, cyclindrical sleeve, refrigerable module and bottom cap.
Figure 2:
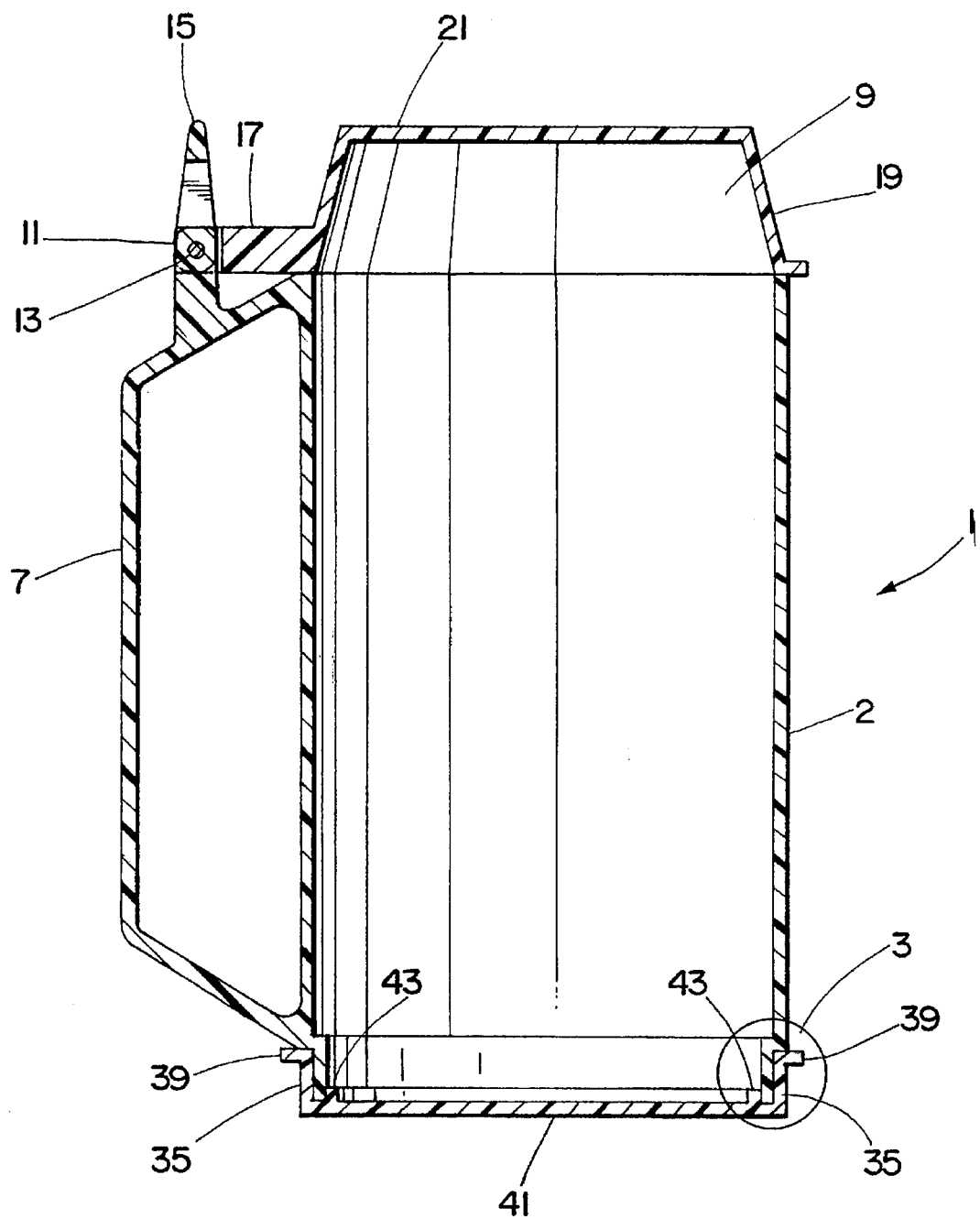
FIG. 2 is cutaway side elevational view of the top cap, sleeve, and bottom cap of the jacket of the invention.
Figure 3:
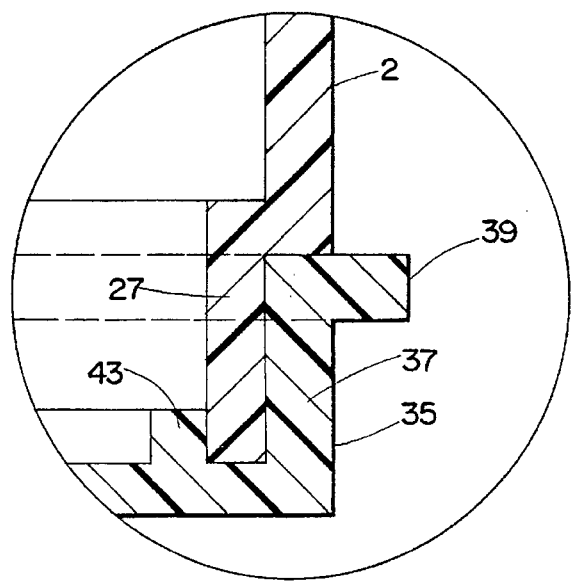
FIG. 3 is an enlargement of a portion of FIG. 2, showing in greater detail the interaction of the flanged bottom edge of the cylindrical sleeve with the bottom cap of the most preferred embodiment of the invention.
Figure 4:
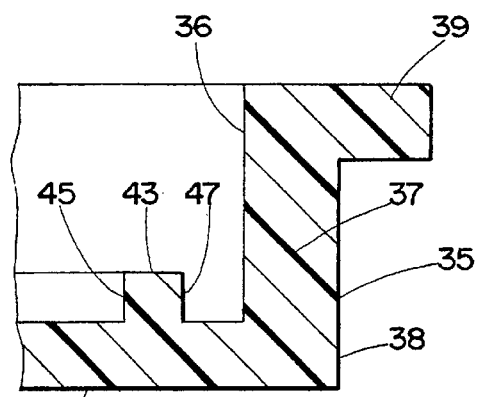
FIG. 4 is a cutaway side elevtional view of the flanges of the bottom cap of the most preferred embodiment of the invention.
Figure 5:
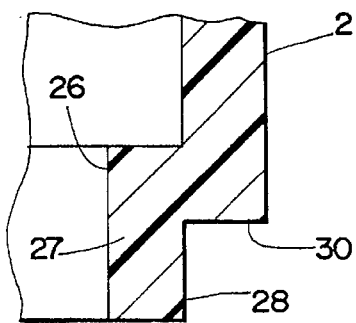
FIG. 5 is a cutaway side elevational view of the flange of the bottom edge of the cylindrical sleeve.

Turning first to FIG. 1, there is shown generally at 1 a preferred embodiment of the invention. A typical beverage can, for example beer or soda pop, 5 is seated within sleeve 2. The can 5 is characterized by an inwardly sloping frusto-conical upper wall 20, an opening means 4 (typically some sort of a "pop-top"), and an opening 6. A D-shaped handle 7 is affixed to the wall of sleeve 2, by means of which a user can grasp, carry and tilt the mug. Although a D-shaped handle is shown, the handle can be of any configuration that will reasonably accomodate a user's hand, including semi-circular, squared, pan handle and so forth. A top cap 9 can cover the top of can 5. Top cap 9 is, in the most preferred embodiment, connected by connecting arm 17 to an upright thumb lever 15. When a pivot pin means 13 is installed and running through pivot support knuckle 11, then top cap 9 can be raised and lowered by the action of the user's thumb on thumb lever 15, pivotally moving about pivot pin means 11. In top cap 9 is an opening 23, formed through the top surface 21, through which a user can insert a straw when cap 9 is down, into can opening 6. Top cap opening 23 can be temporarily closed or sealed off by cap top opening plug 25. Plug 25 can be opened or closed through pivotal movement about a pivot means, or more preferably can slide back and forth to its open and closed positions along an elongate channel or groove formed adjacent to opening 23. Keeping top cap 9 in its lower position helps to keep the top of the beverage can shielded from the rays of the sun, thus minimizing the process by which radiation may warm the beverage can. Although the perimeter wall of the top cap is shown with a frusto-conical shape, this is only the most preferred embodiment intended to most closely fit to the frusto-conical shape of the top of most beverage cans, and it is entirely within the scope of the invention to have a substantially vertical top cap side wall.

Sleeve 5 has formed at its lower end a sleeve flange 27, with an inner side wall 26 and an outer side wall 28. The diameter of sleeve flange 27 is somewhat smaller than the diameter of sleeve 5. The difference in the lesser diameter of sleeve flange 27 and the greater diameter of sleeve 5 results in the formation of a lip 30, which forms an abutment against the upper surface of annular ring 39 of bottom cap 35 when bottom cap 35 is fitted onto sleeve flange 27, described below.

The aforementioned bottom cap 35 has a bottom cap wall 37 of predetermined height, which will generally be at least as great in dimension as that of sleeve flange 27. Bottom cap wall 37 has an inner wall side 36 and an outer wall side 38. Continuously attached to the top of bottom cap wall 37 is an annular planar ring 39, whose upper surface abuts against the lip 30 of sleeve 5, as described above. Wall 37 and bottom 41 circumscribe a hollow space into which refrigerant disc 29 can be inserted. Refrigerant disc 29, in its most preferred embodiment, is characterized by having a perimeter wall 31 of a predetermined height that is approximately the same height as that of sleeve flange 27. Disc 29 is further preferably characterized as having a dome-like convex upper surface, whose form is chosen so as to give the closest possible fit with the concave bottom that is typical of most alumina or steel beverage cans. The beverage can is thus able to rest upon the upper surface of the refrigerant module. Disc 29 forms a dead air hollow that is filled partially or completely with a refrigerant fluid. The refrigerant gives off latent heat of fusion during solidification when exposed to sufficiently low temperatures such as the freezing compartment of conventional refrigerators. As shown in FIG. 9, in a most preferred embodiment of the refrigerant disc, a filler spout 32 is formed to fill the disc with the refrigerant. The spout can be capped or plugged in any suitable fashion. Once solidified, the refrigerant is capable of absorbing heat from the beverage can in the process of thermal convection. In the most preferred embodiment of the disc, an indented discontinuity in the otherwise circular side wall is formed, preferably in the shape of a wedge, as shown. The indented discontinuity has the effect of resulting in a more uniform disc wall thickness during the blow molding process of manufacturing the disc. Otherwise, trying to blow mold such a relatively wide, thin part as the disc is too likely to result in wall thickness variation, but the presence of the indentation relieves stresses on the wall and a more uniform wall thickness results.

Turning to FIGS. 2, 3, 4 and 5, there is shown the system by which, in the most preferred embodiment of the invention, the bottom cap 35 is fitted to the bottom of sleeve 2. An inner annular ring 43 is formed on the bottom wall 41 of bottom cap 35. Inner annular ring 43 has an inner side wall 45 and an outer side wall 47 The distance between outer side wall 47 and bottom cap inner side wall 36 is substantially the same as the thickness of sleeve flange 27. Thus, an annular groove is formed between inner ring 43 and bottom cap wall 37 into which sleeve flange 27 fits, essentially forming a friction fit. The fit between these components is seen overall in FIG. 2 within area 3, which is enlarged in FIG. 3. The bottom cap can, in alternative embodiments, be fitted onto the bottom edge of the sleeve by alternative fastening means, including: by having helical threaded molded thereon, which then screw onto complementary helical threads on the bottom of the sleeve; by being cinched onto the bottom of the cylindrical sleeve by a clamp means around the outside perimeter of the bottom cap; or by snap means, for examplea plurality of pronged tabs that snap into complementary openings in the sleeve bottom.

Figure 8:
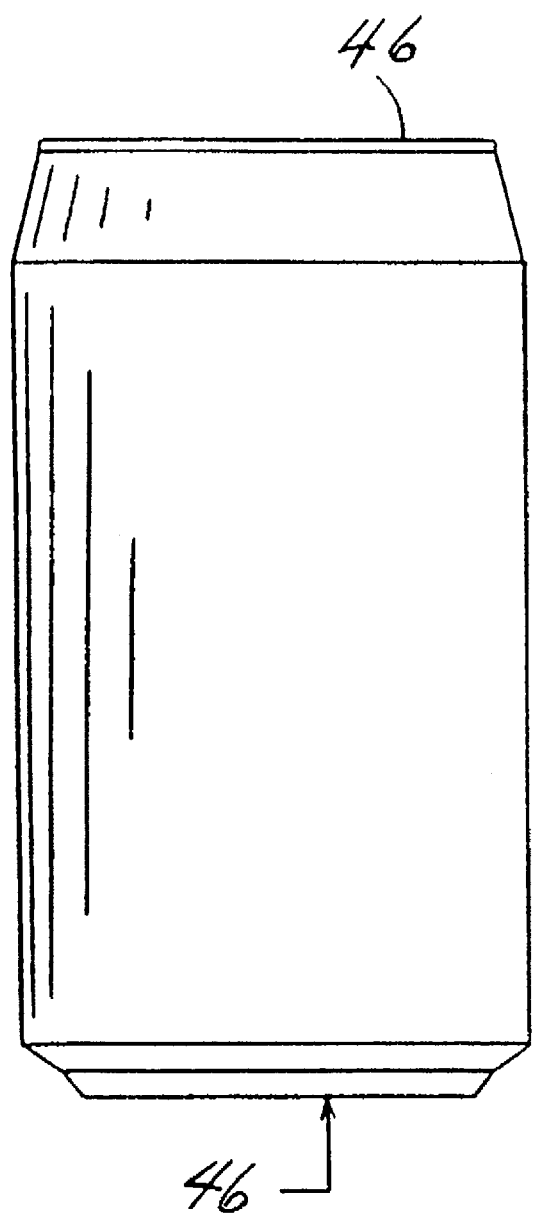
FIG. 8 is a side view of a 12 oz. beverage can.

Turning now to FIGS. 6, 7 and 8, it will be seen that there are two ways the invention can be used. Firstly, a typical 12 oz. beverage can 46 can be directly inserted into sleeve 2. Secondly, interior insulating vessel 44 can be inserted into sleeve 2, so that a beverage can be poured into vessel 44 from a larger container or from a tap or faucet. Vessel 44 is wrapped by insulation covering 42, and is water tight. It can be seen that the overall exterior dimensions of the vessel 44 are approximately the same as those of a typical 12 oz. beverage can, meaning that either the vessel or a can are easily interchangeably inserted into sleeve 5. Additionally, the refrigerant module 29 can be placed into bottom cap 39, which can be used separate and apart from the rest of the system as a frozen or refrigerated coaster onto which a can is set, or onto which the insulating vessel by itself is set.

The components of the jacket are most preferably fabricated by injection molding, according to techniques well known to those in the plastics molding art. The sleeve, top cap, and bottom cap are preferably manufactured of a polymeric material having good thermal insulating properties. Non-limiting examples of such materials include extruded foamed cross-linked polyolefins including cross-linked polyethylene, polystyrene closed cell foam, neoprene, interpolymers of ethylene and propylene, interpolymers of acrylonitrile, butadiene and styrene generally referred to as ABS polymers, polyurethanes, plasticized polyvinyl chloride, polyethyleneacetate, polyacetovinyl chloride, polypropylene, and the like. Freezable refrigerant fluids can include water, methyl cellulose as a viscosity control agent added into water, or the like; and such are generally well known to those of ordinary skill in the fabrication of reusable ice packs for use in hospitals and the like.

While the invention has been described and illustrated with reference to certain preferred embodiments thereof, those skilled in the art will appreciate that various changes, modifications and substitutions can be made therein without departing from the spirit and scope of the invention. It is intended, therefore, that the invention be limited only by the scope of the claims which follow and that such claims be interpreted as broadly as is reasonable.

What is claimed is:

1. An insulated, refrigerated beverage container system, comprising:
    (a) a substantially cylindrical exterior sleeve of predetermined length, having an upper end and a lower end and having inner and outer side walls, said sleeve defining a predetermined interior diameter sufficiently large to accomodate a beverage container;
    (b) an interior insulating vessel having an interior cylindrical sleeve of predetermined length and inner and outer wall surfaces and having a permanently affixed interior bottom cap, said interior cylindrical sleeve circumferentially wrapped by a layer of thermal insulating material along at least a portion of the outer wall surface of said sleeve's length, said vessel being impermeable to liquids, and said interior insulating vessel having an exterior diameter sufficient to permit said vessel to be slideably inserted into said exterior cylindrical sleeve, and having an interior diameter sufficiently large to accomodate a beverage container;
    (c) an exterior bottom cap defining a recess, said cap adapted so as to be removeably attached to the lower end of said sleeve, such that when said bottom cap is attached, then said beverage container system can receive and support a beverage container, said recess being of a predetermined dimension sufficient to receive a refrigerant module means; and
    (d) said refrigerant module means being disk-shaped and defining a hollow core, and having a continuously convex upper surface and having a discontinuous cylindrical sidewall, and being capable of being separately refrigerated, and after being refrigerated, capable of being inserted into said bottom cap recess such that when a beverage container is inserted into said exterior sleeve or when said interior insulating vessel is inserted into said exterior sleeve and said module is inserted into said bottom cap and said bottom cap is attached to the lower end of said sleeve, then said module is in sufficient close proximity to refrigerate said beverage container or said interior insulating vessel.

2. The beverage system as claimed in claim 1, wherein said exterior sleeve additionally comprises a vertical cylindrical sleeve flange of smaller diameter than said sleeve, having an upper end and a lower end and inner and outer side walls, whose upper end is continuously attached to the lower end and inner side wall of said sleeve.

3. The beverage system as claimed in claim 2, wherein said bottom cap is comprised of a bottom cap vertical cylindrical wall having an upper end and a lower end and inner and outer side wall surfaces, having an inner surface dimensioned to receive therein the lower end of said sleeve flange; an annular substantially planar horizontal ring flange whose inner periphery is continuously connected to an upper end of said bottom cap flange outer side wall; a central substantially flat disc whose outer periphery is continuously connected to a lower end of said bottom cap cylindrical wall interior side; and a bottom cap vertical cylindrical sealing flange of smaller diameter than said bottom cap cylindrical wall, said vertical sealing flange having an upper end and a lower end and inner and outer side walls, whose lower end is continuously attached to said substantially flat disc, and whose side wall height is substantially lower than the side wall height of said bottom cap cylindrical wall, said sealing flange positioned so as to define, along with said bottom cap cylindrical wall, an annular groove to receive the lowermost end of said sleeve flange, the outer side wall of said sleeve flange sealing against the inner side wall of said bottom cap cylindrical wall and the inner side wall of said sleeve flange sealing against the outer side wall of said sealing flange.

4. The container system as claimed in claim 1, wherein said refrigerant module disc discontinuous cylindrical sidewall is characterized by having a wedge-shaped indentation.

5. The container system a claimed in claim 4, within which indentation is situated a cappable filler spout for filling said refrigerant module disc with a suitable refrigerant.

6. The container system as claimed in claim 1, additionally comprising a gaspable handle means that is fixably attached to said exterior sleeve.

7. The container system as claimed in claim 1, additionally comprising a top cap, said cap adapted so as to be removeably attached to the upper end of said sleeve.

8. The container system as claimed in claim 7, wherein said top cap is pivotally attached to said handle means by a suitable pivot means that enables said top cap to pivot downwards to cover the top of said beverage container and to pivot upwards to expose the top of said beverage container.

9. The container system as claimed in claim 8, additionally comprising a lever means fixably attached to said pivot means, such that a user of said jacket can grasp said handle and pivot said top cap upwards or downwards with the user's thumb.

10. The container system as claimed in claim 9, wherein said top cap additionally comprises a defined top cap opening of sufficient predetermined diameter so as to allow access to an opening in the top of said beverage container when said top cap is in its downward position and covering the top of said beverage container.

11. The container system as claimed in claim 10, wherein said top cap additionally comprises a cap means for closing said top cap opening.

12. The container system as claimed in claim 1, wherein said disc has a lower surface that is substantially flat.

13. The container system as claimed in claim 1, wherein said refrigerant module forms a surface upon which said beverage container rests when inserted into said exterior sleeve or upon which said interior insulating vessel rests when inserted into said exterior sleeve.

14. The container system as claimed in claim 7, wherein said top cap additionally comprises a frusto-conical side wall continuously attached to a substantially planar top disc.

* * * * *